Sept. 23, 1969  J. P. NARDONE  3,468,552
MACHINE TOOL SPINDLE AND WORKHOLDER ACTUATING MECHANISM
Filed Sept. 22, 1967
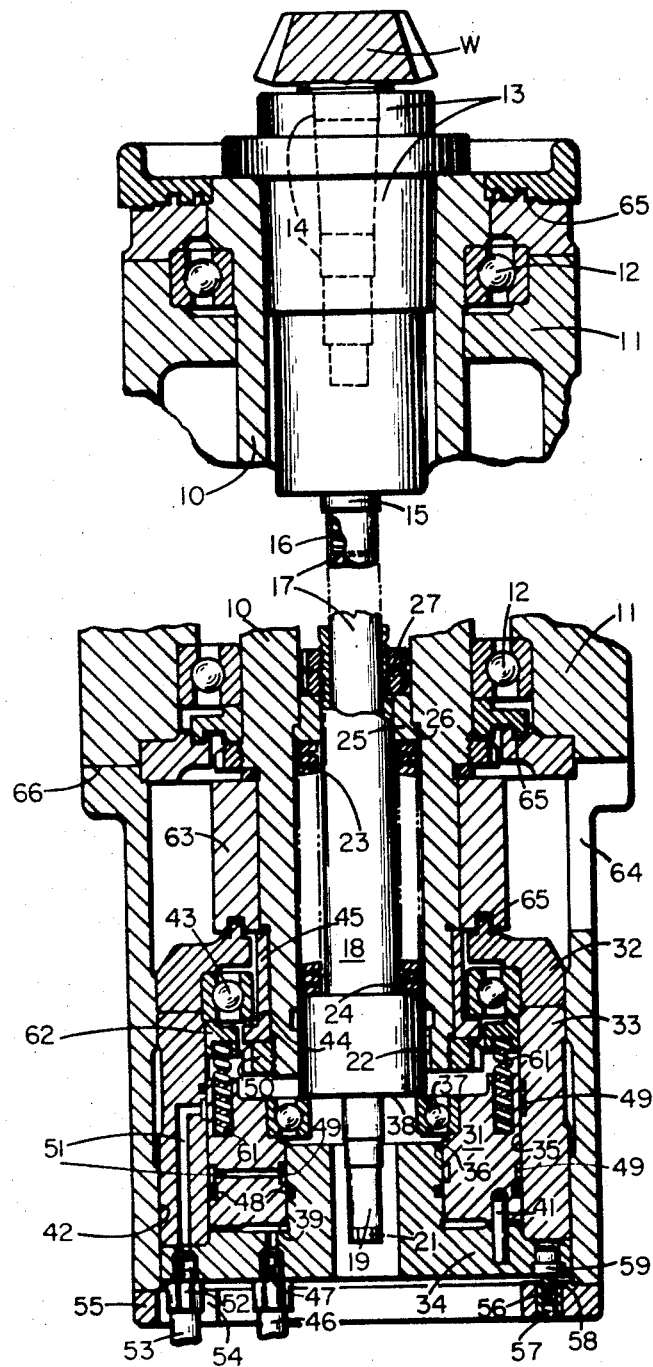
INVENTOR.
JOSEPH P. NARDONE
BY Richard W. Treverton
ATTORNEY

# United States Patent Office 3,468,552
Patented Sept. 23, 1969

3,468,552
MACHINE TOOL SPINDLE AND WORKHOLDER ACTUATING MECHANISM
Joseph P. Nardone, Rochester, N.Y., assignor to The Gleason Works, Rochester, N.Y., a corporation of New York
Filed Sept. 22, 1967, Ser. No. 669,948
Int. Cl. B23b *31/30, 31/10, 5/32*
U.S. Cl. 279—4    8 Claims

ABSTRACT OF THE DISCLOSURE

The spindle of a gear testing machine is rotatable in its housing on anti-friction bearings and carries at one end a workholder actuated by a draw rod extending through the spindle. A spring, acting between the spindle and the draw rod, causes the workholder to grip a workpiece mounted therein. A hydraulically actuated piston-cylinder device, which is slidable axially in the housing, acts between the spindle and draw rod to compress the spring and cause the workholder to release. When hydraulic pressure is applied, the cylinder and piston are moved to first bring anti-friction bearings carried by them respectively into abutment with shoulders on the spindle and draw rod, and then to move the latter relative to the spindle to compress the spring. The arrangement is such that neither the hydraulic pressure nor the spring pressure is applied to the spindle bearings. When hydraulic pressure is not being applied, biasing means hold the cylinder and piston in positions wherein they and the bearings carried by them are completely free of the spindle and draw rod.

---

The present invention relates to a machine tool spindle and workholder actuating mechanism, for example for a gear testing machine, and particularly to a mechanism of this kind which is actuated by fluid pressure.

The workholder on such a spindle is usually operated by a draw rod to cause it to grip or release a workpiece, and for adequate holding of the work very heavy axial loads must be applied to the rod. In the interests of free running of the spindle and of maintaining the truth and accuracy of the spindle bearings it is desirable to prevent such loads from being applied to them. The present invention provides a mechanism whereby the workholder may be actuated by a piston-cylinder device which does not rotate with the spindle and hence does not require a rotating or swivel type fluid pressure connection to the rotating assembly, which during normal operation of the machine is entirely free of the spindle and the parts which rotate with it, and yet in actuating the workholder does not apply substantial axial loads to the spindle bearings.

The accompanying single view of drawing is a sectional view through the mechanism in a plane containing the spindle rotation axis, the central portion of the mechanism being broken away to permit the illustration to be on a larger scale.

The spindle 10, of tubular form, is journaled in housing 11 on anti-friction radial and axial thrust bearings 12 illustrated as being of the ball type, although in other cases it may be preferable that they be of another type, for example hydrostatic. To the upper end of the spindle a work holder 13 for a workpiece W is secured, the workpiece illustrated being a bevel pinion whose shank has cylindrical surfaces 14 to be gripped by contraction of a collet within the workholder. The latter may be of any kind suitable for the work to be held and operable by a draw stem 15. Examples are the contractible chuck disclosed in Patent No. 2,935,329 to G. Hessler for workpieces such as shank type pinions, and the expansible arbor disclosed in Patent No. 3,036,838 to H. J. Barber for ring gears and like workpieces.

The stem 15 when moved downwardly causes the workholder to grip the workpiece, and when moved upwardly releases the work. It is screw-threaded at 16 to one end of a draw rod 17 whose opposite end is secured to a tubular connector 18 by means including a screw-threaded member 19. The latter is adjustable to compensate for workholders and draw rods of different lengths, and for this purpose is provided with a wrench socket 21. The connector is held against rotation in the spindle by a key 22 and is constantly urged downwardly by heavy spring 23, consisting of a stack of spring washers, which acts against shoulder 24 of the connector and reacts against a washer 25 seated against internal shoulder 26 of the spindle. It is this spring 23 which applies work-gripping force to the work holder 13 through the connector 18, draw rod 17 and stem 15. The downward limit position of the connector 18 is adjustable by spanner nut 27 (and the overlying spanner lock nut) which abuts washer 25 in the downward limit position. The adjustment is such that this limit position will be reached only in case no workpiece, or a workpiece with shank surfaces 14 of below-tolerance diameter, is in the workholder. When a workpiece within the allowable tolerance range is in the workholder the downward motion of the draw assembly 15, 17, 18 will be limited by contraction of workholder collet upon the surfaces 14 rather than by abutment of nut 27 with washer 25.

An hydraulic actuator is provided for releasing the workholder by moving the connector 18 upwardly, against the compression of spring 23. The actuator is a fluid displacement device comprising an annular piston element 31 reciprocable axially of the spindle in the annular cylinder chamber of a cylinder element made up of rigidly connected parts 32, 33, 34. The cylinder chamber comprises internal cylindrical surface 35 in part 33 and external cylindrical surface 36 on part 34, both of these surfaces being coaxial with the spindle. The piston 31 carries an anti-friction bearing 37, which in this instance is of the ball type, with its inner ball race adapted to abut shoulder 38 of connector 18 when the piston is moved upwardly by the application of hydraulic pressure to cylinder chamber 39. Otherwise the race is spaced slightly from the shoulder. A pin 41 slidable in cylinder part 34 and in piston 31 holds the latter against rotation.

Cylinder 32, 33, 34 is axially movable on cylindrical surface 42 of the housing 11 and carries an anti-friction (ball) bearing 43 whose inner race is adapted to abut a shoulder 44 provided on the spindle 10, when the cylinder is moved downwardly by the application of hydraulic pressure to chamber 39. The shoulder 44 is formed on a sleeve secured to the spindle by a spanner nut 50. The pressure to chamber 39 is applied through a flexible conduit 46 which opens into the chamber through a tubular fitting 47 secured to member 34 of the cylinder assembly. The cylinder-piston device is sealed by O-rings 48. Any leakage past these rings may return through collector grooves 49, passages 51, fitting 52 and flexible return conduit 53. Fitting 52 extends through a recess 54 in end plate 55 of the housing 11 and thereby serves as a key which holds the cylinder element 32, 33, 34 against rotation.

When conduit 46 (chamber 39) is placed on exhaust, the inner race of bearing 43 is moved out of abutment with shoulder 44 by slight upward movement of the cylinder element by springs 56, four in number, which are arranged in a circle around the peripheral portion of plate 55. Each spring 56 is contained in a capsule 57 secured in the plate, and acts against a hardened steel ball 58 that is retained by the capsule and abuts a hardened steel button 59 secured to cylinder part 34. Similarly, when conduit 46 is placed on exhaust, springs 61 act to move piston 31 downwardly, contracting chamber 39 and moving the inner race of bearing 37 to a position that is out of abutment with shoulder 38 even when the connector 18 in its lower limit position determined by the nut 27 abutting washer 25. The springs 61, which are twenty-four in number in this particular embodiment, are arranged in a circle around the spindle axis, being held as shown in sockets formed in the piston 31 and in a ring 62 which abuts the outer race of bearing 43.

The illustrated spindle is intended to be belt driven and for this purpose has secured thereon a pulley 63, while the housing 11 has an opening 64 for passing the belt. To facilitate assembly, and particularly to enable installation of a drive belt around the pulley, the lower part of the housing 11, beneath juncture plane 66, is removable from the upper part of the housing, without disassembly of the piston-cylinder device or removal of the flexible conduits 46, 53. Labyrinth seals 65 are provided to exclude from the anti-friction bearings and the hydraulically actuated parts such foreign matter as otherwise might enter through the opening 64 and around the upper end of the spindle.

When the spindle is rotating, with a workpiece W chucked in the workholder, the biasing means comprising the springs 56, 61 maintain the cylinder-piston device including the inner races of the bearings 37, 43, free of the rotating spindle assembly so that no drag is imposed on the latter by the device, and no possibility of noise created by such drag can occur. The workpiece is held firmly chucked by action of the spring 23 drawing the rod 17 and stem 15 to their down limit positions determined by the collet of the workholder tightly gripping the chucking surfaces 14 of the workpiece. The force of spring 23, however great, is not applied to the spindle bearings 12.

When dechucking of the work, the application of hydraulic pressure through conduit 46 to chamber 39 overcomes the relatively light force of springs 56, 61, moving the cylinder 32, 33, 34, downwardly until bearing 43 abuts shoulder 44 of the spindle assembly and moving the piston 31 upwardly to cause bearing 37 to abut shoulder 38 of the connector and move upwardly the latter, together with the draw rod 17 and stem 15. However, because the cylinder is free to slide axially on housing surface 42, save for the light opposing pressure of springs 56, this action imposes little load on the spindle bearings 12 even though great pressure against the shoulders 38 and 44 is required. The anti-friction character of the bearings 37, 43 makes it possible to turn the spindle even while such pressure is being applied.

It will be understood that the terms "upward," "downward," and the like, have been used merely for convenience in the description, and that the mechanism may be placed in any attitude that may be preferred in the design of the machine to which the mechanism is applied.

Having now described a preferred embodiment of my invention, what I claim is:

1. A machine tool spindle and workholder actuating mechanism comprising a spindle housing, a tubular spindle journaled on bearings in the housing, the spindle being adapted to support a workholder at one end thereof, an actuating rod for said workholder extending in the spindle and pressure-exerting means acting between the spindle and rod to urge the latter axially in a direction to cause work-gripping action of the workholder, and a fluid displacement device comprising cylinder and piston elements supported by the housing for axial motion relative thereto, said elements being arranged to act upon the application of fluid pressure to said device, in opposite axial directions against the spindle and the rod, to cause work-releasing action of the workholder.

2. A mechanism according to claim 1 having biasing means to maintain said elements free of the spindle and rod when fluid pressure is not being applied to said device.

3. A mechanism according to claim 2 in which the actuating rod is axially adjustable in a connector which has a shoulder for abutment with a bearing carried by the piston element, to apply work-releasing pressure from the piston element to the rod upon the application of fluid pressure to said device, and said biasing means are arranged to move the piston relative to the cylinder element away from said shoulder.

4. A mechanism according to claim 3 in which said pressure-exerting means comprises a spring acting between the spindle and the connector in a direction to urge the latter axially away from the workholder, and said biasing means act to urge the piston element axially away from the workholder.

5. A mechanism according to claim 2 in which the cylinder element carries a bearing for abutment with a shoulder on the spindle upon displacement of the cylinder in response to the application of fluid pressure to said device, and said biasing means are arranged to move the cylinder element relative to the housing axially away from said shoulder.

6. A mechanism according to claim 5 in which said pressure-exerting means are arranged to act between the spindle and the rod in a direction to urge the latter away from the workholder, and the cylinder element moves in the same direction in coming into contact with said abutment.

7. A mechanism according to claim 2 in which the actuating rod is arranged to act in tension in causing work-gripping action of the workholder, there is a connector in which the rod is axially adjustable and which has a shoulder for abutment by an anti-friction bearing carried by the piston element upon movement of the latter toward the workholder in response to application of fluid pressure to said device, the cylinder element carries an anti-friction bearing for abutment with a shoulder on the spindle upon movement of the cylinder element away from the workholder in response to such application of fluid pressure, and said biasing means comprise springs acting between the cylinder element and the piston element to urge the latter away from the shoulder on the connector and other springs acting between the housing and the cylinder element to urge the latter away from the shoulder on the spindle.

8. A mechanism according to claim 7 in which the piston element is of annular form, having inner and outer cylindrical surfaces respectively slidable on outer and inner surfaces of an annular chamber in said cylinder element, and the latter element has a central opening extending axially therethrough for providing access to the end of the draw rod remote from the workholder.

References Cited

UNITED STATES PATENTS

| 2,543,857 | 3/1951 | Leifer | 279—4 |
| 2,886,007 | 5/1959 | Manchester | 279—4 |
| 3,168,322 | 2/1965 | Dziedic | 279—4 |

ROBERT C. RIORDON, Primary Examiner

D. D. EVENSON, Assistant Examiner

U.S. Cl. X.R.

90—11